US012724508B2

(12) United States Patent
Jiang

(10) Patent No.: US 12,724,508 B2
(45) Date of Patent: Sep. 1, 2026

(54) TOUCH SENSING DEVICE AND POWER MANAGEMENT METHOD THEREOF

(71) Applicant: ILI TECHNOLOGY CORP., Hsinchu County (TW)

(72) Inventor: Chun-Yu Jiang, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 19/052,297

(22) Filed: Feb. 13, 2025

(65) Prior Publication Data

US 2026/0236116 A1 Aug. 13, 2026

(51) Int. Cl.
*G06F 3/041* (2006.01)
*G06F 1/3234* (2019.01)

(52) U.S. Cl.
CPC ........ *G06F 3/04162* (2019.05); *G06F 1/3262* (2013.01)

(58) Field of Classification Search
CPC ...... G06F 3/04162; G06F 1/3265; G06F 1/32; G06F 1/3262
See application file for complete search history.

(56) References Cited

U.S. PATENT DOCUMENTS

| | | | |
|---|---|---|---|
| 11,416,088 B1 | 8/2022 | Xie | |
| 2014/0240298 A1 | 8/2014 | Stern | |
| 2016/0077843 A1 | 3/2016 | Jakoboski et al. | |
| 2018/0358961 A1* | 12/2018 | Hanta | H03K 17/962 |
| 2020/0310563 A1 | 10/2020 | Chen | |
| 2022/0129128 A1 | 4/2022 | Jo et al. | |
| 2022/0206661 A1 | 6/2022 | Dang et al. | |
| 2022/0382433 A1 | 12/2022 | Nomura | |
| 2023/0384880 A1* | 11/2023 | Huang | G06F 3/0416 |
| 2023/0409146 A1 | 12/2023 | Kim et al. | |
| 2024/0045517 A1 | 2/2024 | Lin | |
| 2024/0370115 A1* | 11/2024 | Jung | H04W 72/21 |

FOREIGN PATENT DOCUMENTS

| | | | |
|---|---|---|---|
| CN | 101960415 A * | 1/2011 | G06F 3/04166 |
| CN | 102025357 | 4/2011 | |
| CN | 115237278 | 10/2022 | |
| CN | 115774491 | 3/2023 | |
| CN | 116661612 | 8/2023 | |
| TW | 202407516 | 2/2024 | |

OTHER PUBLICATIONS

"Office Action of Taiwan Counterpart Application", issued on Jan. 21, 2026, p. 1-p. 5.

* cited by examiner

*Primary Examiner* — Scott D Au
(74) *Attorney, Agent, or Firm* — JCIPRNET

(57) ABSTRACT

A touch sensing device and a power management method thereof are provided. The touch sensing device includes a touch panel, a power supply and a capacitor circuit. The power supply is used to provide a driving voltage to the touch panel during multiple first sub-periods of an uplink signal transmitting period, and to stop providing the driving voltage to the touch pad during multiple second sub-periods of the uplink signal transmitting period. The capacitor circuit obtains a recycle energy according to a discharge charge flowing from the touch panel during the second sub-periods of the uplink signal transmitting period.

18 Claims, 7 Drawing Sheets

TOUCH SENSING DEVICE AND POWER MANAGEMENT METHOD THEREOF

BACKGROUND

Technical Field

The disclosure relates to a touch sensing device and a power management method thereof, and in particular to a touch sensing device and a power management method capable of reducing energy consumption.

Description of Related Art

In today's electronic devices, human-machine interaction through touch mechanisms has become an important function. In conventional touch sensing devices, it is necessary for the touch sensing device to generate uplink signals to communicate with a stylus. The uplink signals are composed of multiple pulses and are generated through repeated charging and discharging actions of the touch panel. These repeated charging and discharging actions cause unnecessary energy loss, resulting in a waste of energy.

SUMMARY

A touch sensing device and a power management method thereof are provided, which may effectively reduce an energy consumption required by the touch sensing device.

A touch sensing device includes a touch panel, a power supply, and a capacitor circuit. The power supply is coupled to the touch panel and is used to provide a driving voltage to the touch panel during multiple first sub-periods of an uplink signal transmitting period and to stop providing the driving voltage to the touch panel during multiple second sub-periods of the uplink signal transmitting period. The capacitor circuit is coupled to the touch panel to obtain a recycle energy according to a discharge charge flowing from the touch panel during the second sub-periods of the uplink signal transmitting period.

A power management method of the disclosure includes the following steps. A power supply is caused to provide a driving voltage to a touch panel during multiple first sub-periods of an uplink signal transmitting period and to stop providing the driving voltage to the touch panel during multiple second sub-periods of the uplink signal transmitting period. The method also includes causing a capacitor circuit to obtain a recycle energy during the second sub-periods of the uplink signal transmitting period according to a discharge charge flowing from the touch panel.

Based on the above, when the voltage of the uplink signal is pulled down, the touch sensing device provides the discharge charge generated to the capacitor circuit and causes the capacitor circuit to obtain a recycle energy according to the discharge charge flowing from the touch panel. In this way, the energy of the discharge charge is not wasted, effectively saving the energy consumption required by the touch sensing device.

DESCRIPTION OF THE EMBODIMENTS

Figure 1:
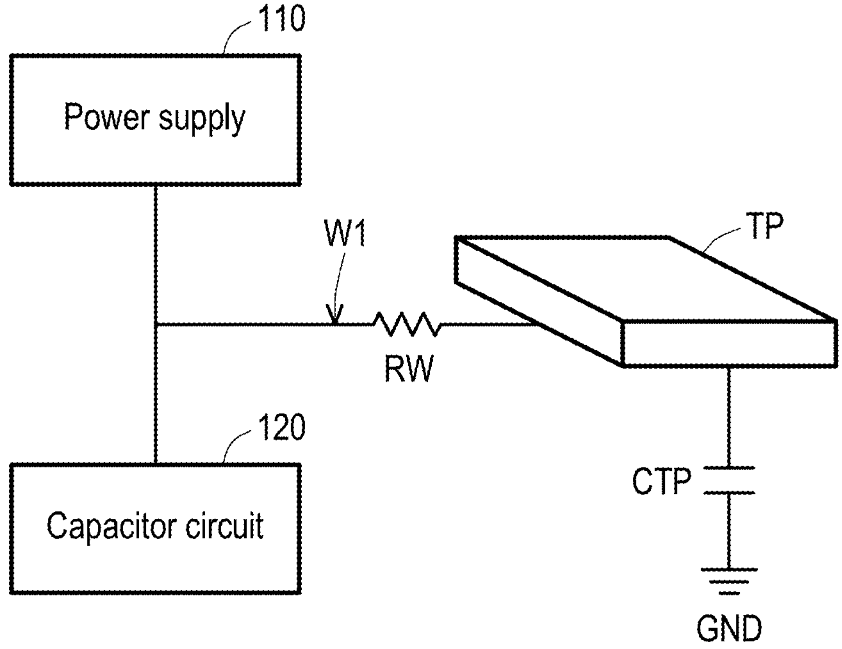
FIG. 1 illustrates a schematic diagram of a touch sensing device according to an embodiment of the disclosure.

Referring to FIG. 1, FIG. 1 illustrates a schematic diagram of a touch sensing device according to an embodiment of the disclosure. The touch sensing device 100 includes a touch panel TP, a power supply 110, and a capacitor circuit 120. In this embodiment, the touch panel TP and a reference ground terminal GND may be considered as an equivalent capacitor CTP. The touch panel TP is coupled to the power supply 110 via a transmission wire W1, where the transmission wire W1 has a transmission resistance RW. On the other hand, the capacitor circuit 120 is also coupled to the touch panel TP via the transmission wire W1.

The touch panel TP in the touch sensing device 100 may transmit uplink signals during an uplink signal transmitting period to sense whether a stylus is present and further communicate with the stylus. In this embodiment of the disclosure, during the uplink signal transmitting period, the power supply 110 may provide a driving voltage to the touch panel TP during multiple first sub-periods. Additionally, during multiple second sub-periods of the uplink signal transmitting period, the power supply 110 may stop providing the driving voltage to the touch panel TP. Instead, the capacitor circuit 120 receives discharge charges flowing from the touch panel TP via the transmission wire W1 and obtains recycle energy according to the received discharge charges.

In the description above, the first sub-periods and the second sub-periods occur alternately. During each of the first sub-periods, the touch panel TP may receive an uplink signal with a first voltage. During each of the second sub-periods, the touch panel TP may receive and transmit an uplink signal with a second voltage, wherein the first voltage is greater than the second voltage.

From the above description, it may be understood that in the touch sensing device 100 of this embodiment, during the uplink signal transmitting period, discharge charges generated when the uplink signal is pulled down from the first voltage to the second voltage may flow to the capacitor circuit. Energy recovery may be performed through the capacitor circuit. In this way, the energy consumption of the touch sensing device 100 may be effectively reduced, achieving an energy-saving effect.

Figure 2:
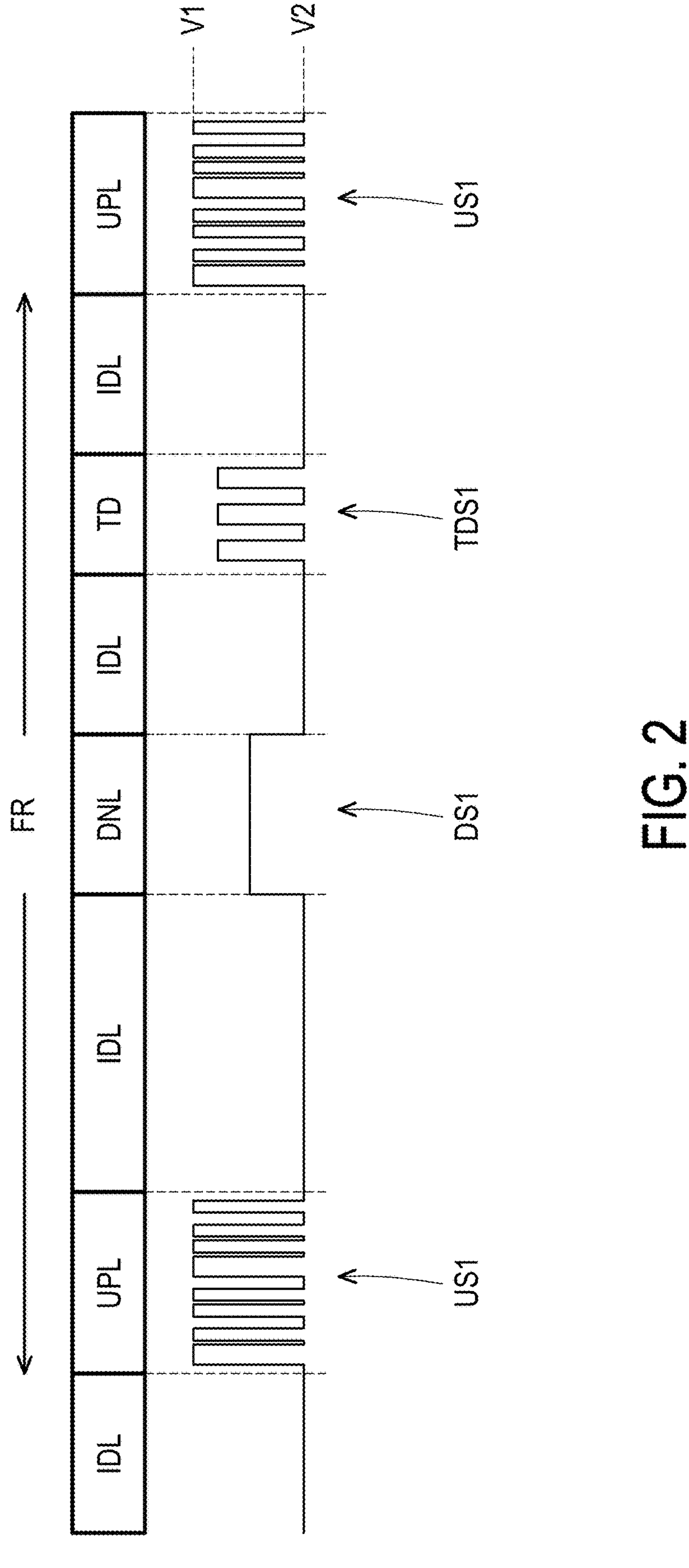
FIG. 2 illustrates a schematic diagram of the operation flow of the touch sensing device according to an embodiment of the disclosure.

Referring to FIG. 2, FIG. 2 illustrates a schematic diagram of the operation flow of the touch sensing device according to an embodiment of the disclosure. In a frame FR, the operating mode of the touch sensing device may switch among multiple periods, including an uplink signal transmitting period UPL, an idle period IDL, a downlink signal receiving period DNL, and a touch sensing period TD. During the first uplink signal transmitting period UPL in FIG. 2, the touch panel may transmit an uplink signal US1. During the downlink signal receiving period DNL, the touch panel may receive a downlink signal DS1. During the touch sensing period TD, the touch panel may transmit a touch sensing drive signal TDS1. During the second uplink signal transmitting period UPL in FIG. 2, the touch panel may transmit the uplink signal US1 again.

In this embodiment, the uplink signal US1 may be a pulse-width modulation signal that transitions between a first voltage V1 and a second voltage V2. The downlink signal DS1 may be a direct current voltage signal. The touch sensing drive signal TDS1 may be a pulse signal with a fixed duty cycle. Additionally, during the idle period IDL, the voltage on the touch panel may remain equal to a direct current voltage, such as the ground voltage.

Figure 3:
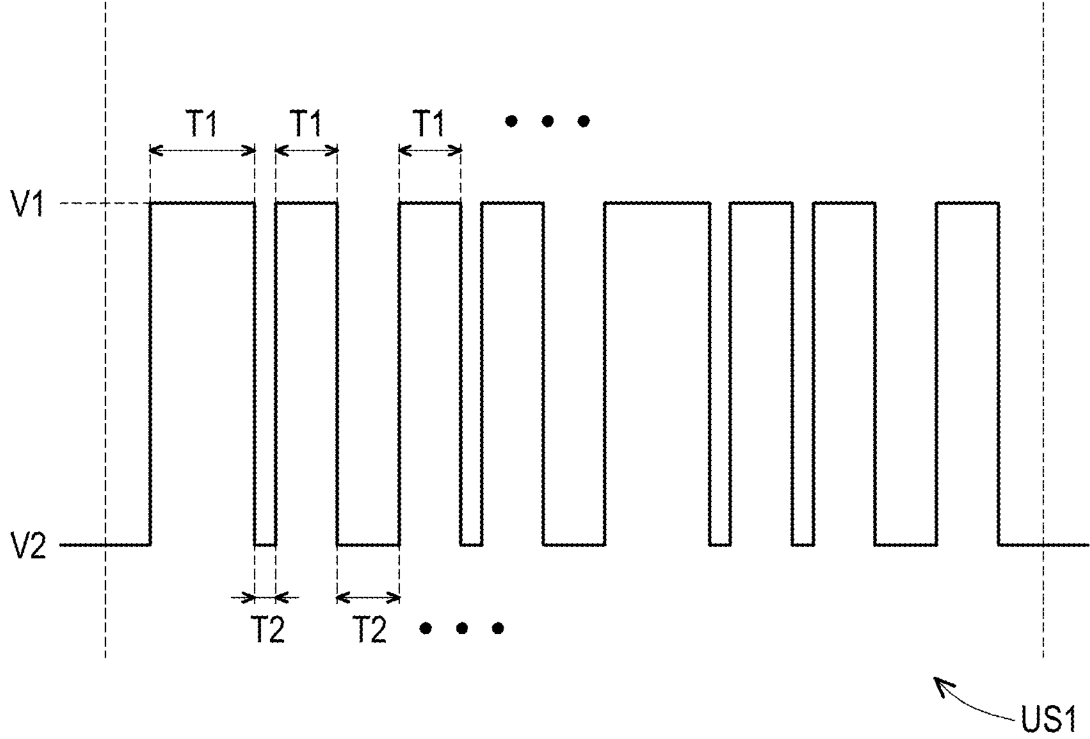
FIG. 3 is an enlarged schematic diagram of the uplink signal in the embodiment of FIG. 2.

Referring to both FIG. 2 and FIG. 3, FIG. 3 is an enlarged schematic diagram of the uplink signal in the embodiment of FIG. 2. The uplink signal transmitting period UPL includes multiple first sub-periods T1 and multiple second sub-periods T2. FIG. 3 only illustrates some of the first sub-periods T1 and some of the second sub-periods T2 for explanation. The first sub-periods T1 and the second sub-periods T2 are alternately interleaved. During the first sub-periods T1, the uplink signal US1 equals the relatively high first voltage V1. During the second sub-periods T2, the uplink signal US1 equals the relatively low second voltage V2.

During the first sub-periods T1, the touch panel may receive a driving voltage for charging, thereby raising the voltage of the uplink signal US1 to the first voltage V1. During the second sub-periods T2, the touch panel may stop receiving the driving voltage and begin discharging, thereby lowering the voltage of the uplink signal US1 to the second voltage V2.

Figure 4:
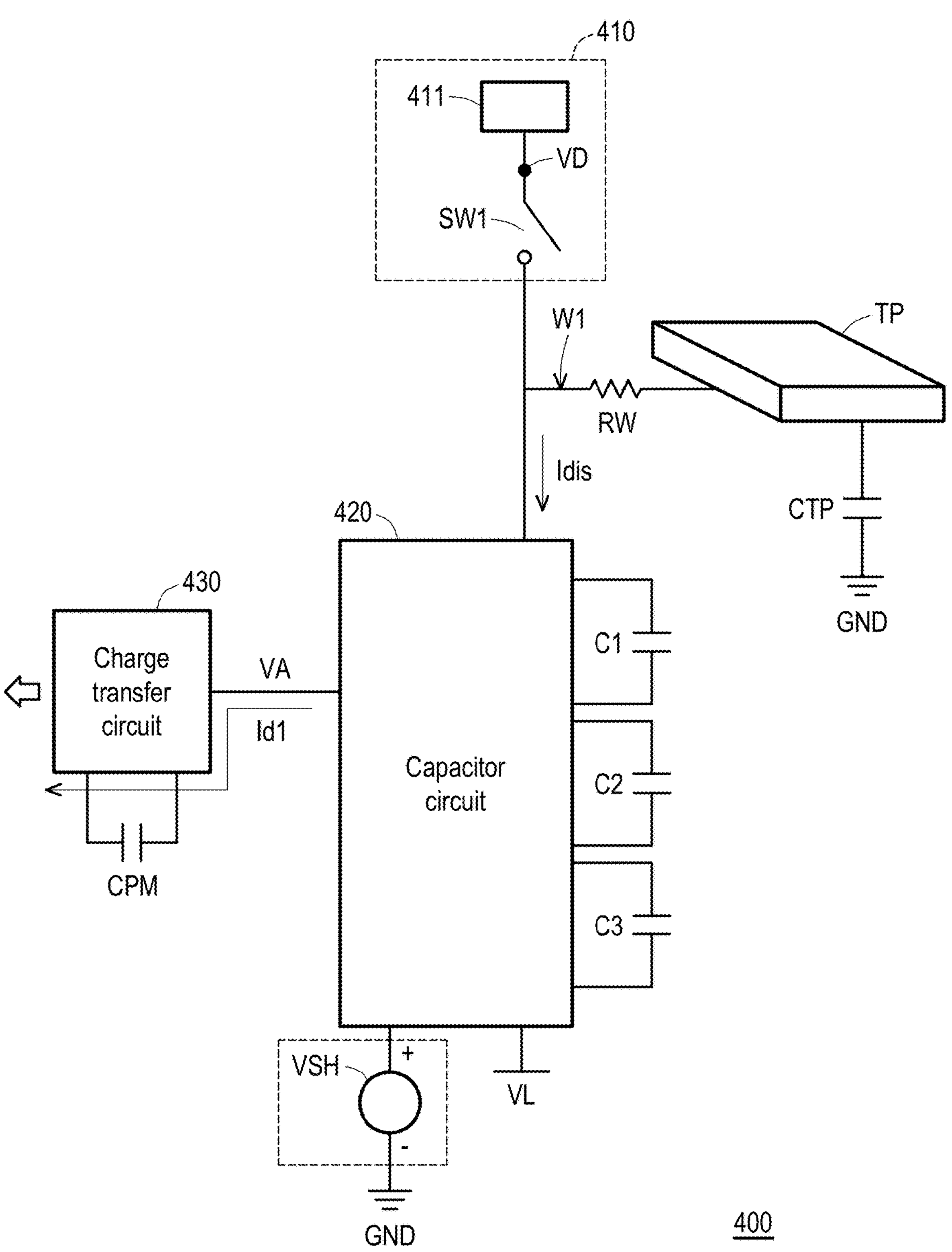
FIG. 4 illustrates a schematic diagram of the touch sensing device according to another embodiment of the disclosure.

Referring to FIG. 4, FIG. 4 illustrates a schematic diagram of another embodiment of the touch sensing device according to the disclosure. The touch sensing device 400 includes a touch panel TP, a power supply 410, a capacitor circuit 420, and a charge transfer circuit 430. The power supply 410 and the capacitor circuit 420 are coupled to the touch panel TP via the transmission wire W1. The power supply 410 includes a power supply switch SW1, wherein the power supply switch SW1 is coupled between a driving power source 411 and the touch panel TP. The driving power source 411 is used to generate a driving voltage VD. During each of the first sub-periods of the uplink signal transmitting period, the power supply switch SW1 is turned on, and the driving voltage VD generated by the driving power source 411 is transmitted to the touch panel TP via the transmission wire W1 to charge the equivalent capacitor CTP on the touch panel TP.

Furthermore, during each of the second sub-periods of the uplink signal transmitting period, the power supply switch SW1 is turned off. The power supply 410 stops supplying the driving voltage VD to the touch panel TP.

In this embodiment, the capacitor circuit 420 may, for example, be a charge pump circuit. The capacitor circuit 420 includes multiple capacitors C1 to C3, which may serve as flying capacitors coupled to the charge pump circuit. During each of the second sub-periods of the uplink signal transmitting period, the equivalent capacitor CTP discharges and generates a discharge current Idis. The discharge current Idis flows to the capacitor circuit 420 and charges at least one of the capacitors C1 to C3 in the capacitor circuit 420 to obtain recycle energy.

In this embodiment, the capacitor circuit 420 may generate an offset voltage VSH. The capacitor circuit 420 may produce a charging current Id1 according to the offset voltage VSH, and the charging current Id1 charges an energy storage capacitor CPM in the charge transfer circuit 430 using the recycle energy stored in the capacitor circuit 420.

In some embodiments of the disclosure, the voltage magnitude generated by the offset power source VSH may be dynamically adjusted.

In this embodiment, the charge transfer circuit 430 may receive the stored energy in the energy storage capacitor CPM and use it as operating energy for application circuits in the touch sensing device 100 to perform other functions. In this way, the recycle energy stored in the capacitor circuit 420 may be recovered and reused, improving energy utilization efficiency.

Notably, in the embodiments of the disclosure, the charge transfer circuit 430 may be a power management circuit. It may allocate the stored energy in the energy storage capacitor CPM to any circuit of the electronic device corresponding to the touch sensing device and provide auxiliary energy to the corresponding circuit.

Notably, in this embodiment, the capacitor circuit 420, which is a charge pump circuit, may provide the voltage required for the display panel of the electronic device to perform screen display. Therefore, when the display panel of the electronic device enters a dark screen state, the voltage generation circuit 430 is idle and does not operate. In this case, the capacitors C1 to C3 in the capacitor circuit 420 may not be used and may serve as a medium for storing the recycle energy. That is, in the embodiments of the disclosure, the capacitors C1 to C3 in the capacitor circuit 420 may be constructed using existing components without requiring additional components, thereby reducing the required circuit cost.

It is worth mentioning that other embodiments of the disclosure may use additional capacitors in the capacitor circuit 420 or use idle capacitors within the capacitor circuit 420 as a medium for storing the recycle energy.

Figure 5A:
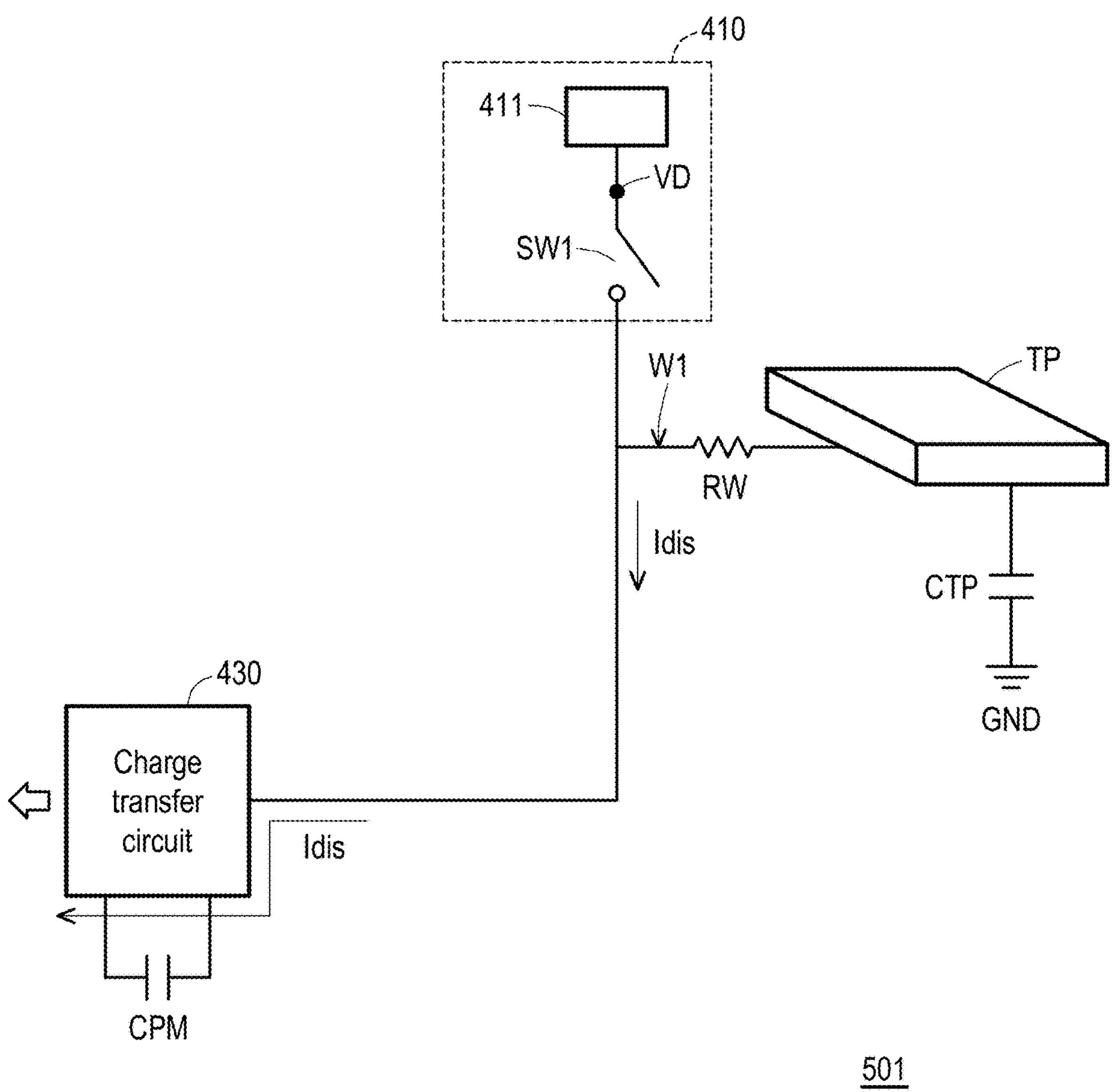
FIG. 5A and FIG. 5B illustrate schematic diagrams of the touch sensing device according to different embodiments of the disclosure.

Referring to FIG. 5A, FIG. 5A illustrates a schematic diagram of another embodiment of the touch sensing device according to the disclosure. The touch sensing device 501 includes a touch panel TP, a power supply 410, and a charge transfer circuit 430. In this embodiment, the charge transfer circuit 430 may act as the capacitor circuit and is coupled to the touch panel TP and the power supply 410. Continuing from the embodiment in FIG. 4, during each of the second sub-periods of the uplink signal transmitting period, the discharge charge generated by the discharging of the equivalent capacitor CTP may directly charge the energy storage capacitor CPM in the charge transfer circuit 430, thereby recovering energy. The charge transfer circuit 430 may be coupled to an application circuit (not shown) and provide the recycle energy to serve as part of the operating energy required for the application circuit to operate.

Figure 5B:
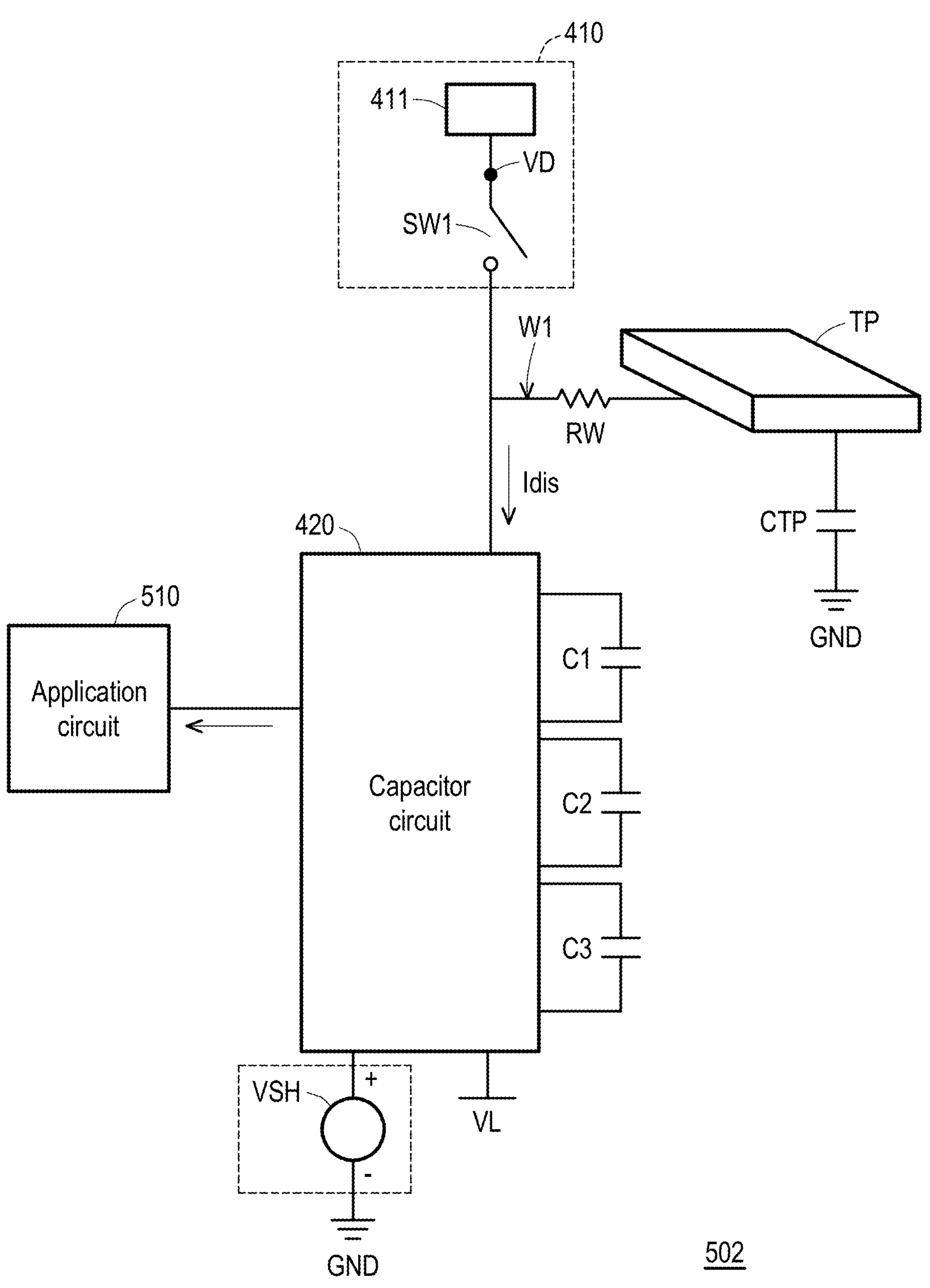

Then, referring to FIG. 5B, FIG. 5B illustrates a schematic diagram of another embodiment of the touch sensing device according to the disclosure. The touch sensing device 502 includes a touch panel TP, a power supply 410, a capacitor circuit 420, and an application circuit 510. In this embodiment, the capacitor circuit 420 may provide a charging current based on the stored recycle energy to charge the application circuit 510, thereby providing part of the operating energy required for the operation of the application circuit 510.

Figure 6:
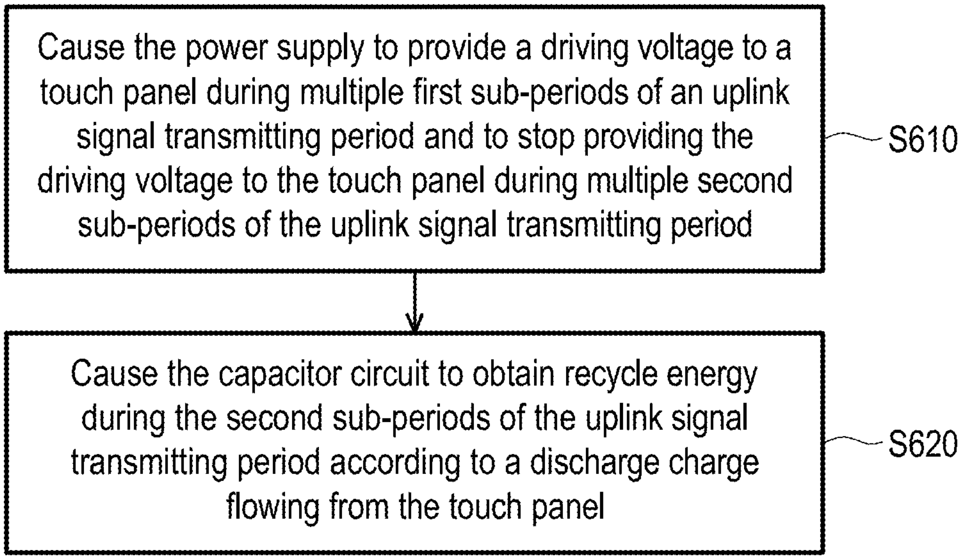
FIG. 6 illustrates a flowchart of the power management method according to an embodiment of the disclosure.

Referring to FIG. 6, FIG. 6 illustrates a flowchart of the power management method according to an embodiment of the disclosure. The power management method of FIG. 6 is applicable to a touch sensing device. In step S610, the power supply is caused to provide a driving voltage to the touch panel during the first sub-periods of an uplink signal transmitting period and to stop providing the driving voltage to the touch panel during the second sub-periods of the uplink signal transmitting period. In step S620, the capacitor circuit is caused to obtain recycle energy during the second sub-periods of the uplink signal transmitting period based on the discharge charge flowing from the touch panel.

The implementation details of the above steps have been described in detail in the aforementioned embodiments and will not be redundantly elaborated here.

In summary, in the touch sensing device of the disclosure, during the uplink signal transmitting period, when the touch panel generates a discharge current, the capacitor circuit is provided to generate recycle energy based on the discharge charge. Accordingly, the energy consumed during the discharge action of the touch panel will not be wasted, and the energy consumption required by the touch sensing device may be effectively reduced, achieving an energy-saving effect.

What is claimed is:

1. A touch sensing device, comprising:

a touch panel;

a power supply, coupled to the touch panel, and used to provide a driving voltage to the touch panel during a plurality of first sub-periods of an uplink signal transmitting period and to stop providing the driving voltage to the touch panel during a plurality of second sub-periods of the uplink signal transmitting period; and a capacitor circuit, coupled to the touch panel, and configured to obtain a recycle energy according to a discharge charge flowing from the touch panel during the plurality of second sub-periods of the uplink signal transmitting period, wherein the capacitor circuit is further coupled to an offset power source, used to be superimposed on a voltage of the capacitor circuit to generate an adjusted voltage and provide the adjusted voltage so as to charge an energy storage capacitor.

2. The touch sensing device according to claim 1, wherein the plurality of first sub-periods and the plurality of second sub-periods are interleaved with each other.

3. The touch sensing device according to claim 1, wherein the touch panel generates an uplink signal having a first voltage during each of the plurality of first sub-periods and pulls down the uplink signal to a second voltage during each of the plurality of second sub-periods.

4. The touch sensing device according to claim 1, wherein the power supply comprises:

a switch, coupled between a driving power source and the touch panel, wherein the switch is turned on during each of the plurality of first sub-periods to provide the driving voltage generated by the driving power source to the touch panel, wherein the switch is further turned off during each of the plurality of second sub-periods.

5. The touch sensing device according to claim 1, wherein the capacitor circuit is coupled to a charge transfer circuit, the touch sensing device further comprising:

an application circuit, coupled to the charge transfer circuit and receiving the recycle energy as an operating energy.

6. The touch sensing device according to claim 1, wherein the capacitor circuit is a charge transfer circuit, and the charge transfer circuit receives the discharge charge to obtain the recycle energy, the touch sensing device further comprising:

an application circuit, coupled to the charge transfer circuit and receiving the recycle energy as an operating energy.

7. The touch sensing device according to claim 1, further comprising:

an application circuit, coupled to the capacitor circuit and receiving a stored energy in the energy storage capacitor as a part of the operating energy.

8. The touch sensing device according to claim 1, wherein the capacitor circuit provides at least one capacitor as a medium for storing the recycle energy, and the at least one capacitor is an external idle capacitor or an internal idle capacitor.

9. The touch sensing device according to claim 8, wherein when a display panel corresponding to the touch sensing device enters a dark screen state, the at least one capacitor is an idle capacitor.

10. A power management method, comprising:

causing a power supply to provide a driving voltage to a touch panel during a plurality of first sub-periods of an uplink signal transmitting period, and to stop providing the driving voltage to the touch panel during a plurality of second sub-periods of the uplink signal transmitting period;

causing a capacitor circuit to obtain a recycle energy according to a discharge charge flowing from the touch panel during the plurality of second sub-periods of the uplink signal transmitting period;

providing an offset power source to superimpose on a voltage of the capacitor circuit so as to generate an adjusted voltage; and providing the adjusted voltage to charge an energy storage capacitor.

11. The power management method according to claim 10, wherein the plurality of first sub-periods and the plurality of second sub-periods are interleaved with each other.

12. The power management method according to claim 10, further comprising:

causing the touch panel to generate an uplink signal having a first voltage during each of the plurality of first sub-periods and to pull down the uplink signal to a second voltage during each of the plurality of second sub-periods.

13. The power management method according to claim 10, wherein causing the power supply to provide the driving voltage to the touch panel during the plurality of first sub-periods of the uplink signal transmitting period and to stop providing the driving voltage to the touch panel during the plurality of second sub-periods of the uplink signal transmitting period comprises:

disposing a switch between a driving power source and the touch panel;

turning on the switch during each of the plurality of first sub-periods such that the driving voltage generated by the driving power source is provided to the touch panel; and turning off the switch during each of the plurality of second sub-periods.

14. The power management method according to claim 10, further comprising:

causing the capacitor circuit to be coupled to a charge transfer circuit; and causing the touch sensing device to further comprise an application circuit, wherein the application circuit is coupled to the charge transfer circuit and receives the recycle energy as an operating energy.

15. The power management method according to claim 10, further comprising:

causing the capacitor circuit to be a charge transfer circuit;

causing the charge transfer circuit to receive the recycle energy; and causing the touch sensing device to further comprise an application circuit, wherein the application circuit receives the recycle energy as an operating energy.

16. The power management method according to claim 10, further comprising:

providing a stored energy of the energy storage capacitor to an application circuit as a part of an operating energy of the application circuit.

17. The power management method according to claim 10, further comprising:

causing the capacitor circuit to provide at least one capacitor as a medium for storing the recycle energy, wherein the at least one capacitor is an external capacitor or an internal idle capacitor.

18. The power management method according to claim 17, further comprising:

when a display panel corresponding to the touch sensing device enters a dark screen state, causing the at least one capacitor to be an idle capacitor.

* * * * *